United States Patent
Kim et al.

(10) Patent No.: US 9,042,435 B2
(45) Date of Patent: May 26, 2015

(54) TRANSMITTER AND RECEIVER FOR FREQUENCY DOMAIN EQUALIZATION

(71) Applicants: Samsung Electronics Co., Ltd., Yeongtong-gu, Suwon-si (KR); Postech Academy-Industry Foundation, Pohang-si (KR)

(72) Inventors: Dong Sik Kim, Gunwi-gun (KR); Ui Kun Kwon, Pohang-si (KR); Gi Hong Im, Pohang-si (KR); Chang Yong Shin, Seoul (KR)

(73) Assignees: Samsung Electronics Co., Ltd., Suwon-si (KR); Postech Academy-Industry Foundation, Pohang-si (KR)

( * ) Notice: Subject to any disclaimer, the term of this patent is extended or adjusted under 35 U.S.C. 154(b) by 0 days.

(21) Appl. No.: 13/849,637

(22) Filed: Mar. 25, 2013

(65) Prior Publication Data

US 2013/0208781 A1 Aug. 15, 2013

Related U.S. Application Data (62) Division of application No. 12/246,385, filed on Oct. 6, 2008, now Pat. No. 8,428,199.

(30) Foreign Application Priority Data

Apr. 4, 2008 (KR) .................. 10-2008-0031742

(51) Int. Cl.
*H03H 7/30* (2006.01)
*H03H 7/40* (2006.01)
*H03K 5/159* (2006.01)
*H04L 27/01* (2006.01)
*H04L 25/03* (2006.01)

(52) U.S. Cl.
CPC .......... *H04L 27/01* (2013.01); *H04L 25/03159* (2013.01); *H04L 25/03171* (2013.01); *H04L 2025/03414* (2013.01); *H04L 2025/03796* (2013.01)

(58) Field of Classification Search
USPC .................................. 375/232, 295, 344, 229
See application file for complete search history.

(56) References Cited

U.S. PATENT DOCUMENTS

2003/0185179 A1* 10/2003 Inogai et al. .................. 370/335
2006/0250937 A1 11/2006 Wang et al.
(Continued)

FOREIGN PATENT DOCUMENTS

KR 10-2007-0074431 A 7/2007
KR 10-2007-0075650 A 7/2007
(Continued)

OTHER PUBLICATIONS

U.K. Kwon, D. Kim and G.H.IM, "Frequency domain pilot multiplexing technique for channel estimation of SC-FDE," Electronics Letters, Feb. 28, 2008, vol. 44 No. 5, 2 pages.

*Primary Examiner* — Erin File
(74) *Attorney, Agent, or Firm* — NSIP Law (57) ABSTRACT

A transmitter and/or receiver for performing frequency domain equalization is provided. A transmitter includes a pilot position determination unit for determining positions for inserting pilots in a frequency domain based on frequency spectrums of data, and a pilot insertion unit for inserting the pilots between the frequency spectrums of the data according to the determined positions for inserting the pilots.

15 Claims, 6 Drawing Sheets

(56) References Cited

U.S. PATENT DOCUMENTS

| | | | |
|---|---|---|---|
| 2007/0296596 A1 | 12/2007 | Moore | |
| 2008/0037680 A1* | 2/2008 | Sakata et al. | 375/267 |
| 2008/0062946 A1 | 3/2008 | Jeong | |
| 2008/0101306 A1 | 5/2008 | Bertrand et al. | |
| 2008/0150803 A1* | 6/2008 | Ban | 342/383 |
| 2008/0219371 A1* | 9/2008 | Hong et al. | 375/260 |
| 2008/0240314 A1 | 10/2008 | Gaal et al. | |
| 2009/0225893 A1 | 9/2009 | Yang et al. | |

FOREIGN PATENT DOCUMENTS

| | | |
|---|---|---|
| KR | 10-2007-0081397 A | 8/2007 |
| KR | 10-2007-0104865 A | 10/2007 |
| WO | WO 2006/099222 | 9/2006 |

* cited by examiner

TRANSMITTER AND RECEIVER FOR FREQUENCY DOMAIN EQUALIZATION

CROSS-REFERENCE TO RELATED APPLICATION

This application is a divisional of, and claims the benefit of priority provided by, parent application Ser. No. 12/246,385, filed on Oct. 6, 2008, and both this and the parent application claim the benefit of priority provided, under 35 U.S.C. §119 (a), of Korean Patent Application No. 10-2008-0031742, filed on Apr. 4, 2008 in the Korean Intellectual Property Office, the disclosure of which is incorporated herein by reference in its entirety.

TECHNICAL FIELD

The following description relates to a wireless communication system, and more particularly, to a transmitter and/or receiver for performing frequency domain equalization.

BACKGROUND

Generally, users and service providers require communication services be available regardless of time and location, and with a high quality at a low cost. There are provided an Orthogonal Frequency Division Multiplexing (OFDM) scheme, a Single Carrier Frequency Domain Equalization (SC-FDE) scheme, and the like to achieve a high speed data transmission rate.

For a receiver for performing frequency domain equalization to equalize distortion of a signal transmitted from a transmitter through a wireless channel, a wireless channel state may be required to be estimated by the receiver. In this case, the receiver may estimate the wireless channel state based on pilots transmitted from the transmitter.

The transmitter may transmit the pilots to the receiver using various methods.

As an example, a transmitter may decrease the number of data to be transmitted to a receiver, so as to insert a number of pilots in a frequency domain. For example, the transmitter may decrease the number of data up to an 'x' number of pilots in a frequency domain to insert the 'x' number of pilots. In this case, spectral efficiency may be deteriorated since the number of data to be transmitted to the receiver is decreased to insert the number of pilots.

As another example, a transmitter may eliminate data in a frequency domain and insert pilots in positions corresponding to the eliminated data. In this case, distortion may exist in a time domain signal since there are eliminated data in the frequency domain.

Accordingly, there is needed a technique that may reduce the distortion of a signal without deteriorating efficiency of a frequency.

SUMMARY

In one general aspect, a transmitter comprises a pilot position determination unit which determines positions for inserting pilots in a frequency domain based on frequency spectrums of data, and a pilot insertion unit which inserts the pilots between the frequency spectrums of the data according to the determined positions for inserting the pilots.

The pilot position determination unit may determine the positions for inserting the pilots based on distortion strength of the data.

The pilot position determination unit may determine the positions for inserting the pilots based on the frequency spectrums of the data so as to minimize distortion strength of the data.

The pilot position determination unit may extract the frequency spectrums of the data according to a predetermined frequency interval, and determine the positions for inserting the pilots based on the extracted frequency spectrums of the data so that the distortion strength of the data is a minimum.

The pilot insertion unit may eliminate target elimination spectrums corresponding to the determined positions for inserting the pilots from among the frequency spectrums of the data, and insert the pilots according to the determined positions for inserting the pilots.

The pilot insertion unit may insert the pilots between the frequency spectrums of the data according to the determined positions for inserting the pilots with a predetermined frequency interval.

The transmitter may further comprise an inverse discrete Fourier transformer (IDFT) which transforms the frequency spectrums of the data and the inserted pilots into a time domain signals.

The transmitter may further comprise a cyclic shifter which cyclic-shifts the frequency spectrums of the data and the inserted pilots so that at least one target pilot of the pilots exists in a predetermined position.

In another general aspect, a receiver for performing frequency domain equalization comprises a signal receiving unit which receives a signal transmitted from a transmitter via a channel, a first discrete Fourier transformer (DFT) which transforms the received signal into a first frequency domain signal, the first frequency domain signal including frequency spectrums of data and pilots, a channel estimator which ascertains positions of the pilots with respect to positions of the frequency spectrums of the data using a channel frequency response being calculated based on the pilots, and estimates a frequency response of the channel, and a frequency domain equalizer which performs equalization with respect to the first frequency domain signal based on the estimated frequency response of the channel.

The receiver may further comprise a detector which detects the data in a time domain according to an iterated detecting scheme.

The detector may comprise an inverse discrete Fourier transformer (IDFT) which transforms an output of the frequency domain equalizer into a time domain signal, a decision unit which makes a decision with respect to an output of the IDFT, a second DFT which transforms an output of the decision unit into a frequency domain signal, and an adder which provides a signal being generated by adding an output of the second DFT and the output of the frequency domain equalizer to the IDFT.

The detector may iteratively detect the data up to a predetermined number of times.

The channel estimator may analyze, in a time domain, a channel frequency response being calculated based on the data and a channel frequency response being calculated based on the pilots to ascertain the positions of the pilots, and estimate the frequency response of the channel.

The channel estimator may ascertain the positions of the pilots based on a dispersion of a first time domain response and a dispersion of a second time domain response, and estimates the frequency response of the channel, wherein the first time domain response is a time domain representation of a channel frequency response being calculated based on the data and the second time domain response is a time domain representation of the channel frequency response being calculated based on the pilots.

In still another general aspect, a receiver for performing frequency domain equalization comprises a signal receiving unit which receives a signal transmitted from a transmitter via a channel, a first discrete Fourier transformer (DFT) which transforms the received signal into a first frequency domain signal, the first frequency domain signal including frequency spectrums of data and pilots, and the frequency spectrums of the data and the pilots being cyclic-shifted so that at least one target pilot of the pilots exists in a predetermined position, a frequency domain equalizer which estimates the channel based on the pilots and equalizes the first frequency domain signal based on the estimated channel, a first inverse discrete Fourier transformer (IDFT) which transforms an output of the frequency domain equalizer into a time domain signal, a cyclic shift determination unit which determines how much the frequency spectrums of the data and the pilots are cyclic-shifted, based on an output of the first IDFT, a phase adjusting unit which adjusts a phase of the output of the first IDFT based on the determination result, and a decision unit which makes a decision with respect to the data using an output of the phase adjusting unit.

The receiver may further comprise a second DFT which transforms an output of the decision unit into a frequency domain signal, an inverse cyclic shifter which cyclic-shifts the output of the frequency domain equalizer as much as the frequency spectrums of the data and the pilots have been cyclic-shifted, in an inverse direction to that of the frequency spectrums of the data and the pilots, an adder which adds an output of the inverse cyclic shifter and an output of the second DFT, and a second IDFT which transforms an output of the adder into a time domain signal and provides the transformed time domain signal to the decision unit.

In yet another general aspect, a signal transmission method for performing frequency domain equalization comprises determining positions for inserting pilots in a frequency domain based on frequency spectrums of data, and inserting the pilots between the frequency spectrums of the data according to the determined positions for inserting the pilots.

The determining of the positions for inserting the pilots may comprise calculating distortion strength of the data based on the frequency spectrums of the data where the pilots are inserted, and determining the positions for inserting the pilots so that the calculated distortion strength is a minimum.

The method may further comprise cyclic-shifting the frequency spectrums of the data and the inserted pilots so that at least one target pilot of the pilots exists in a predetermined position.

Other features will become apparent to those skilled in the art from the following detailed description, which, taken in conjunction with the attached drawings, discloses exemplary embodiments of the invention

BRIEF DESCRIPTION OF THE DRAWINGS

Throughout the drawings and the detailed description, unless otherwise described, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, description of well-known functions and constructions are omitted to increase clarity and conciseness.

Figure 1:
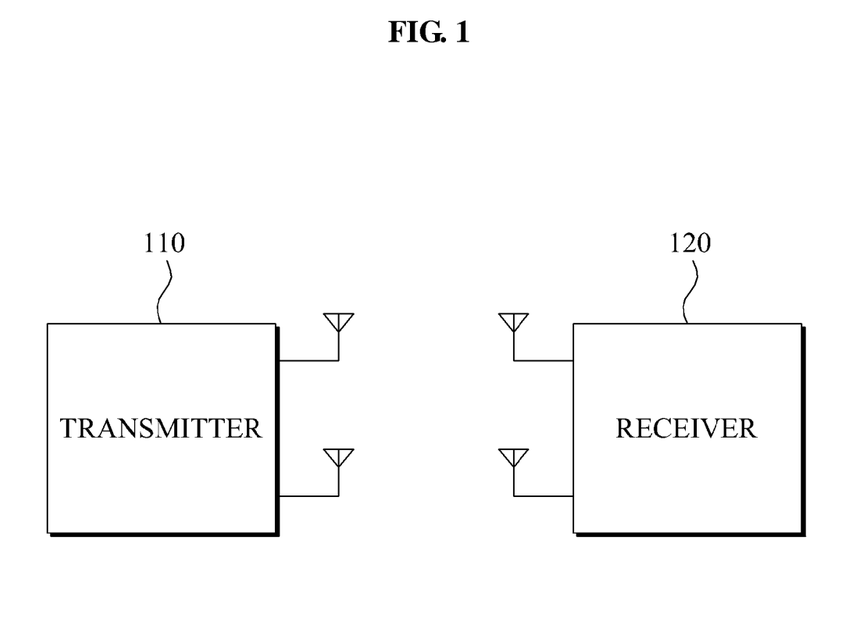
FIG. 1 is a diagram illustrating a transmitter and a receiver according to an exemplary embodiment.

FIG. 1 illustrates a transmitter 110 and a receiver 120 according to an exemplary embodiment.

Referring to FIG. 1, a wireless channel is formed between the transmitter 110 and the receiver 120. The receiver 120 estimates the wireless channel state based on pilots transmitted from the transmitter 110. Also, the receiver 120 performs equalization with respect to received signals in a frequency domain based on the estimated wireless channel state.

The transmitter 110 may transmit signals in each block to the receiver 120, and a transmission length of a single block may be N in a time domain.

The single block may include an Np number of pilot signals. In this case, the pilots $\{C_k\}_{k=0}^{N_p-1}$ in the frequency domain transmitted from the transmitter 110 may be represented by, $$C_k = \begin{cases} e^{j\pi rk^2/N_p}, & \text{for even } N_p \\ e^{j\pi rk(k+1)/N_p}, & \text{for odd } N_p \end{cases} \quad \text{[Equation 1]}$$

where r indicates a relatively prime of Np.

It may be desirable to arrange pilots in a suitable position in a frequency domain. As an example, it is assumed that specific frequency spectrums of frequency spectrums are randomly eliminated, and pilots are arranged in place of the eliminated specific frequency spectrums. In this case, a transmission signal, which is generated through transformation into a time domain after the pilots are arranged, may be distorted, the transmission signal being generated by transforming original data into a time domain due to the eliminated frequency spectrums. Also, where pilots are additionally arranged to frequency spectrums of data, spectral efficiency may be deteriorated since a number of data being transmitted is decreased. Therefore, according to an aspect, there is provided a method of reducing distortion of a signal without deteriorating the spectral efficiency.

Determining Positions of Pilots

1) An Exemplary Method:

Data in a time domain included in a single block with a transmission length N are $\{s_n\}_{n=0}^{N-1}$, and $\{s_n\}_{n=0}^{N-1}$ may be transformed into frequency spectrums $\{S_k\}_{k=0}^{N-1}$ via a discrete Fourier Transformation. Also, $\{C_k\}_{k=0}^{N_p-1}$ may be arranged with a predetermined frequency interval.

In this case, $\Phi_m$ and $\Psi_m$ may be defined as described in Equation 2.

$$\Phi_m = [S_m, S_{M+m}, S_{2M+m}, \ldots, S_{(N_p-1)M+m}]^T$$

$$\Psi_m = \{m, M+m, \ldots, (N_p-1)M+m\}, \ 0 \le m < M. \quad \text{[Equation 2]}$$

Here, it is assumed that a time domain signal with respect to a signal whose frequency spectrums $\Phi_m$ corresponding to a position of $\Psi_m$ from among frequency spectrums of data is eliminated is $\{x'_{m,n}\}_{n=0}^{N-1}$. In this case, distortion strength between an original signal and a signal being actually transmitted may be represented by, $$|s_n - x'_{m,n}|^2. \quad \text{[Equation 3]}$$

Therefore, a position of the first pilot of the Np number of pilots may be determined via Equation 4. Where the position of the first pilot is determined, all positions of the Np number of pilots may be determined since a frequency interval of neighboring pilots is M.

$$d_o = \underset{m}{\operatorname{argmin}} \sum_{n=0}^{N-1} |s_n - x'_{m,n}|^2 \quad \text{[Equation 4]}$$

$$= \underset{m}{\operatorname{argmin}} \sum_{n=0}^{N-1} \left| \frac{1}{\sqrt{N}} \sum_{k \in \Psi_m} S_k e^{j\frac{2\pi nk}{N}} \right|^2$$

$$= \underset{m}{\operatorname{argmin}} \left( \sum_{k \in \Psi_m} |S_k|^2 + \frac{1}{N} \sum_{n=0}^{N-1} \sum_{k \in \Psi_m} \sum_{\substack{l \in \Psi_m \\ l \ne k}} S_k S_l^* e^{j\frac{2\pi n(k-l)}{N}} \right).$$

After the positions of the pilots are determined, pilots may be arranged in place of the frequency spectrums of the data. Consequently, representation in a frequency domain of a transmission signal X may be represented by, $$X = [S_0, \ldots, S_{d_o-1}, C_0, \ldots, S_{M+d_o-1}, C_1, \ldots, S_{N-1}]^T. \quad \text{[Equation 5]}$$

Referring to the Equation 5, $S_{d_o}$ and $S_{M+d_o}$ are eliminated and $C_0$ and $C_1$ are inserted in their place.

Also, X may be transformed into $\{x_n\}_{n=0}^{N-1}$ via an inverse discrete Fourier transform (IDFT). Consequently, it may be ascertained $\{x_n\}_{n=0}^{N-1}$ is a signal which includes pilots and minimizes distortion strength of $\{s_n\}_{n=0}^{N-1}$.

2) Cyclic Shift:

Elements included in X may be left cyclic-shifted up to $d_o$ number of times, and X may be transformed into $X_2$. That is, $X_2$ may be represented by, $$X_2 = [C_0, \ldots, S_{M+d_o-1}, C_1, \ldots, S_{N-1}, S_0, \ldots, S_{d_o-1}]^T. \quad \text{[Equation 6]}$$

That is, X may be cyclic-shifted so that $C_0$ becomes the first frequency element of $X_2$. In this case, the receiver 120 may detect pilots by ascertaining a number of times X is cyclic-shifted and a direction X is cyclic-shifted to. Here, $C_0$ may not be required to be a first frequency element of $X_2$, and a position of $C_0$ in $X_2$ may depend on an establishment scheme.

Detection of Pilots

The transmitter 110 may insert pilots according to the above described exemplary method, and transmit a transmission signal in a time domain to the receiver 120. According to an exemplary embodiment, the receiver 120 detects the pilots to estimate a channel state and to perform frequency domain equalization.

1) where the Transmitter 110 Arranges Pilots Using the Exemplary Method, and Transmits a Transmission Signal X in a Frequency Domain:

The receiver 120 may need to ascertain positions of pilots in a frequency domain. Where the transmitter 110 transmits information associated with $d_o$ to the receiver 120, the receiver 120 may ascertain the positions of the pilots in the frequency domain based on the information associated with $d_o$. However, the receiver 120 may ascertain the positions of the pilots in the frequency domain without the information associated with $d_o$.

Frequency representation of the received signal in the receiver 120 may be represented by, $$R_k = \begin{cases} H_k C_k + V_k, & k (\operatorname{mod} M) = d_o \\ H_k S_k + V_k, & \text{otherwise} \end{cases} \quad \text{[Equation 7]}$$

where $H_k$ indicates a channel frequency response of a $K^{th}$ carrier, and $V_k$ indicates a zero-mean complex additive white Gaussian noise. Here, Equation 8 may be provided:

$$\Lambda_{kM+m} = R_{kM+m}/C_k$$

$$\Lambda_m \triangleq [\Lambda_m, \Lambda_{M+m}, \Lambda_{2M+m}, \ldots, \Lambda_{(N_p-1)M+m}]^T \quad \text{[Equation 8]}$$

where $\Lambda_m$ may be represented in a time domain by, $$\{\lambda_{0,n}\}_{n=0}^{N_p-1}, \ldots, \{\lambda_{M-1,n}\}_{n=0}^{N_p-1}. \quad \text{[Equation 9]}$$

Where $m = d_o$, it is considered that the receiver 120 has performed channel estimation normally in a frequency domain. However, where is $m \ne d_o$, it is considered that the receiver 120 has not performed the channel estimation normally in a frequency domain. Equation 10 may be represented by a central limit theorem.

$$\lambda_{m,n} \approx \begin{cases} \sqrt{N_p} h_n, & \text{if } m = d_o \\ N(0, \sigma_s^2), & \text{otherwise.} \end{cases} \quad \text{[Equation 10]}$$

where an average of $N(0, \sigma_s^2)$ is 0, $\sigma_s^2$ is dispersion.

The receiver 120 may ascertain positions of pilots based on dispersion of amplitudes of each of $\{\lambda_{0,n}\}_{n=0}^{N_p-1}, \ldots, \{\lambda_{M-1,n}\}_{n=0}^{N_p-1}$. In this case, the receiver 120 may estimate $d_o$ using Equation 11.

$$\overline{\lambda}_m = \frac{1}{N_p} \sum_{n=0}^{N_p-1} |\lambda_{m,n}| \quad \text{[Equation 11]}$$

$$\hat{d}_o = \underset{m}{\operatorname{argmax}} \frac{1}{N_p} \sum_{n=0}^{N_p-1} (|\lambda_{m,n}| - \overline{\lambda}_m)^2.$$

As described above, the receiver 120 may estimate $d_o$, and ascertain the positions of the pilots. Also, the receiver 120 may estimate a channel state based on the pilots, and may perform equalization in a frequency domain using the estimated channel state.

2) where the Transmitter 110 Transmits $X_2$:

Where the transmitter 110 transmits $X_2$, the receiver 120 may ascertain that a first frequency element of $X_2$ is $C_0$. In this case, where frequency spectrums of data included in $X_2$ are cyclic-shifted up to $d_o$ number of times, the receiver 120 may be need to ascertain $d_o$ number of times. Also, the receiver 120 may correctly detect data by cyclic-shifting the received signal up to $d_o$ number of times in an inverse direction of the frequency spectrums of data included in $X_2$ being cyclic-shifted.

A signal having performed equalization in a frequency domain by the receiver 120 may be represented by, $$Y_k = \begin{cases} 0, & k(\bmod M) = 0, \\ \dfrac{H_k^*}{|\hat{H}_k|^2 + \sigma_v^2} R_k = W_k R_k, & \text{otherwise,} \end{cases}$$ [Equation 12]

A 'Cyclic shift' in a frequency domain may correspond to a 'phase shift' in a time domain. That is, $d_o$ may be estimated based on a time domain signal $y_n$ corresponding to $Y_k$ as below:

$$\hat{d}_o = \underset{m}{\operatorname{argmin}} \frac{1}{N} \sum_{n=0}^{N-1} \left[ \min_{a_i \in \chi} \left| y_n e^{j\frac{2\pi mn}{N}} - a_i \right|^2 \right].$$ [Equation 13]

Consequently, $d_o$ may be estimated via the Equation 13, and based on the estimated $d_o$, a number of times frequency spectrums are cyclic-shifted may be ascertained, so as to correctly detect data in a time domain.

Restore Distorted Signal

The receiver 120 according to an exemplary embodiment may detect data using an iterated detecting scheme. That is, data detected in a time domain may be distorted due to frequency spectrums which have been eliminated to insert pilots. However, the receiver 120 may recover the frequency spectrums which have been eliminated to insert pilots using the data detected in the time domain, and may repeatedly use the restored frequency spectrums to detect data in a time domain. In this case, the receiver 120 may recover the frequency spectrums which have been eliminated to insert pilots by iterating the above described operations.

Here, the operations of the receiver 120 may be represented by, $$\tilde{S}_k^{(i)} = \begin{cases} \hat{S}_k^{(i-1)}, & k(\bmod M) = \hat{d}_o \\ \tilde{S}_k^{(0)}, & \text{otherwise} \end{cases}$$ [Equation 14]

Where i is 0, $\tilde{S}_k^{(i)}$ is a signal after equalization is performed in a frequency domain. Where i is larger than 0, $\tilde{S}_k^{(i)}$ is representation in a frequency domain of a restored signal. Also, data are determined in a time domain where a number of times of iterations is i−1, and the determined data are transformed into a signal $\hat{S}_k^{(i-1)}$ in a frequency domain.

Figure 2:
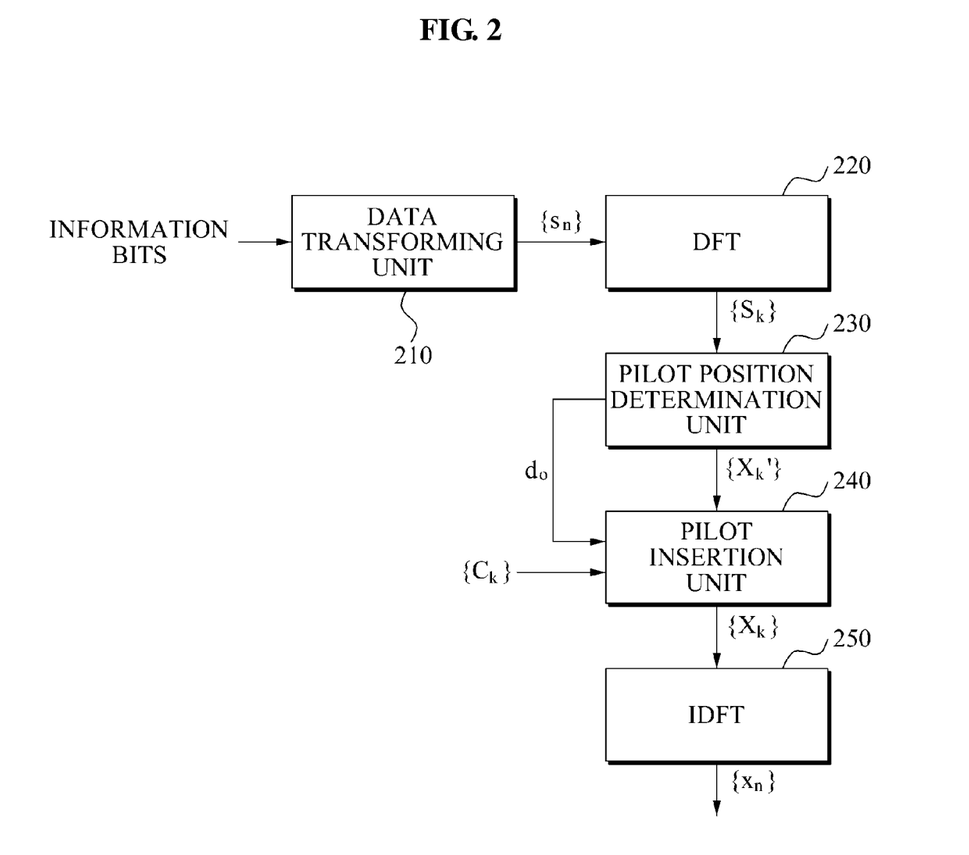
FIG. 2 is a diagram illustrating a transmitter for performing frequency domain equalization according to an exemplary embodiment.

FIG. 2 illustrates a transmitter for performing frequency domain equalization according to an exemplary embodiment.

As illustrated in FIG. 2, the transmitter for performing frequency domain equalization comprises a data transformation unit 210, a discrete Fourier transformer (DFT) 220, a pilot position determination unit 230, a pilot insertion unit 240, and an inverse discrete Fourier transformer (IDFT) 250.

The data transformation unit 210 transforms information bits according to various transformation schemes. Outputs of the data transformation unit 210 are referred to as $\{s_n\}$.

The DFT 220 transforms the data $\{s_n\}$ into frequency spectrums $\{S_k\}$.

The pilot position determination unit 230 determines positions for inserting pilots $\{C_k\}$ in a frequency domain based on the frequency spectrums $\{S_k\}$ of data. The pilot position determination unit 230 may calculate distortion strength of data as described above, and determine the positions for inserting the pilots $\{C_k\}$ so that the calculated distortion strength may be a minimum. In this case, since frequency intervals between the pilots $\{C_k\}$ are uniform, the pilot position determination unit 230 may determine the positions of all pilots by determining $d_o$ for the first pilot.

The pilot insertion unit 240 are provided with $d_o$ and $\{X'_k\}$ from the pilot position determination unit 230. The pilot insertion unit 240 eliminates frequency spectrums which correspond to positions for inserting pilots from among the frequency spectrums of data, and inserts the pilots $\{C_k\}$ between the frequency spectrums $\{X'_k\}$ of the data. Once the pilots $\{C_k\}$ are inserted between the frequency spectrums of the data $\{X'_k\}$, $\{X_k\}$ is generated.

The IDFT 250 transforms the $\{X_k\}$ into a time domain signal $\{x_n\}$, and the time domain signal $\{x_n\}$ is transmitted to the receiver 120 via an antenna.

Figure 3:
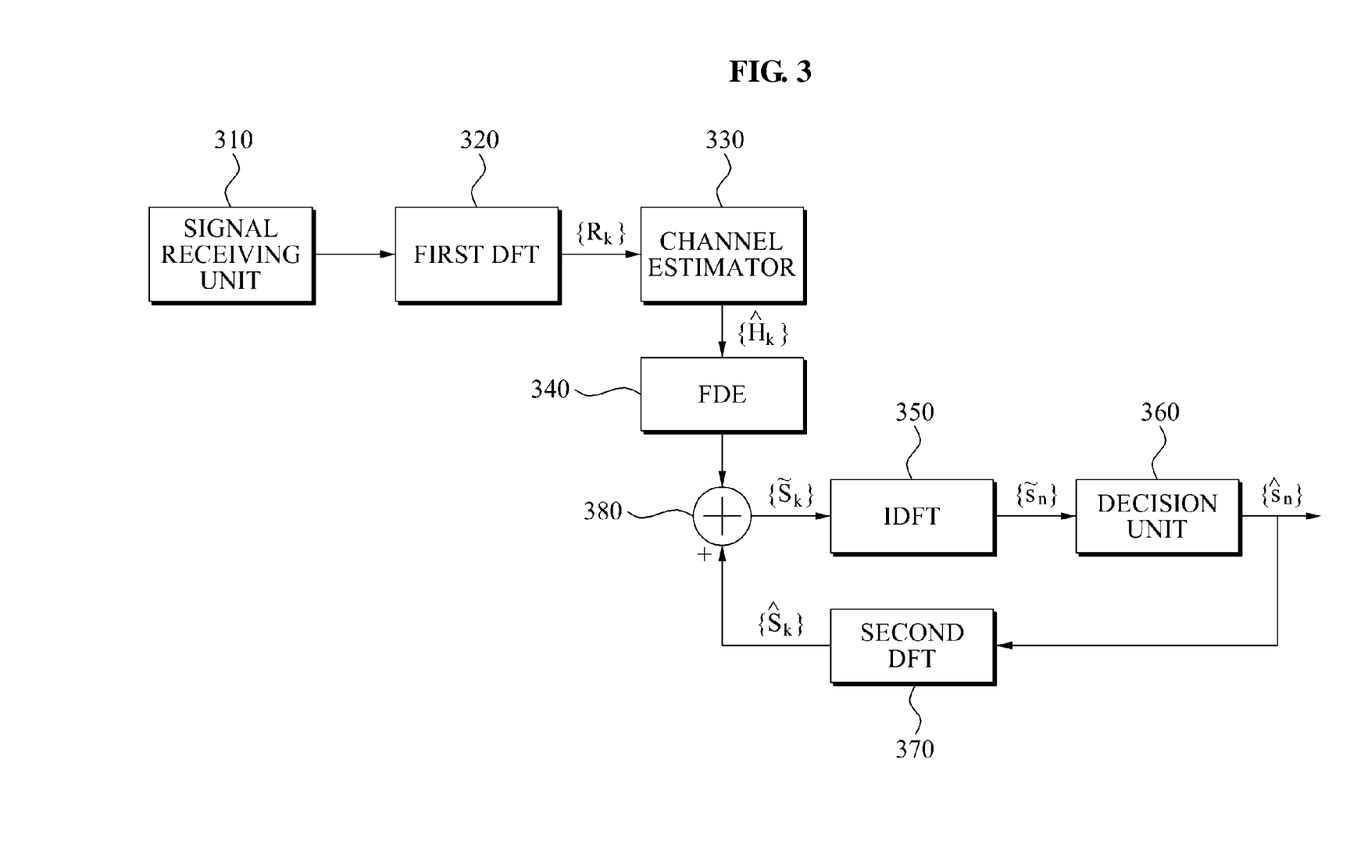
FIG. 3 is a diagram illustrating a receiver for performing frequency domain equalization according to an exemplary embodiment.

FIG. 3 illustrates a receiver for performing frequency domain equalization according to an exemplary embodiment.

As illustrated in FIG. 3, the receiver comprises a signal receiving unit 310, a first DFT 320, a channel estimator 330, a frequency domain equalizer 340, an IDFT 350, a decision unit 360, a second DFT 370, and an adder 380.

In the exemplary embodiment of FIG. 3, it is assumed that a transmitter transmits a signal being generated by inserting pilots between frequency spectrums of data without cyclic-shifting the pilots between the frequency spectrums of the data.

The signal receiving unit 310 receives a signal transmitted from the transmitter via a formed channel between the receiver and the transmitter.

The first DFT 320 transforms the received signal into a first signal in a frequency domain. In this case, the first signal may include frequency spectrums of data and pilots. The pilots exist in positions of partial frequency spectrums of the frequency spectrums of the data, which are originally scheduled to be transmitted. However, the partial frequency spectrums may not be included in the first signal. But, the partial frequency spectrums may be recovered using an iterated detecting scheme.

The channel estimator 330 ascertains the positions of the pilots with respect to the positions of the frequency spectrums of the data by comparing a channel frequency response being calculated based on pilots with a channel frequency response being calculated based on data. The channel estimator 330 detects the pilots based on the ascertained positions of the pilots, and estimates a frequency response of a channel.

The frequency domain equalizer 340 performs equalization in a frequency domain with respect to the first signal based on the estimated frequency response of the channel.

Although not illustrated in FIG. 3, a detector detects data in a time domain using an iterated detecting scheme. The detector may include the IDFT 350, the decision unit 360, the second DFT 370, and the adder 380.

Where a number of times of iterations is 0, the IDFT 350 transforms $\{\tilde{S}_k\}$ into a time domain signal $\{\tilde{s}_n\}$.

The decision unit 360 determines $\{\tilde{s}_n\}$ using, for example, a maximum likelihood detection scheme.

The second DFT 370 transforms the determined $\{\tilde{s}_n\}$ into a frequency domain signal $\{\hat{S}_k\}$.

The adder 380 provides the IDFT 350 with a new signal $\{\hat{S}_k\}$, which is generated by adding $\{\hat{S}_k\}$, to an output of the frequency domain equalizer 340.

Consequently, the detector including the IDFT 350, the decider 360, and the second DFT 370, and the adder 380 may perform the above detection operation up to a predetermined number of times so as to recover a distorted signal which is distorted due to the frequency spectrums of the eliminated data.

Figure 4:
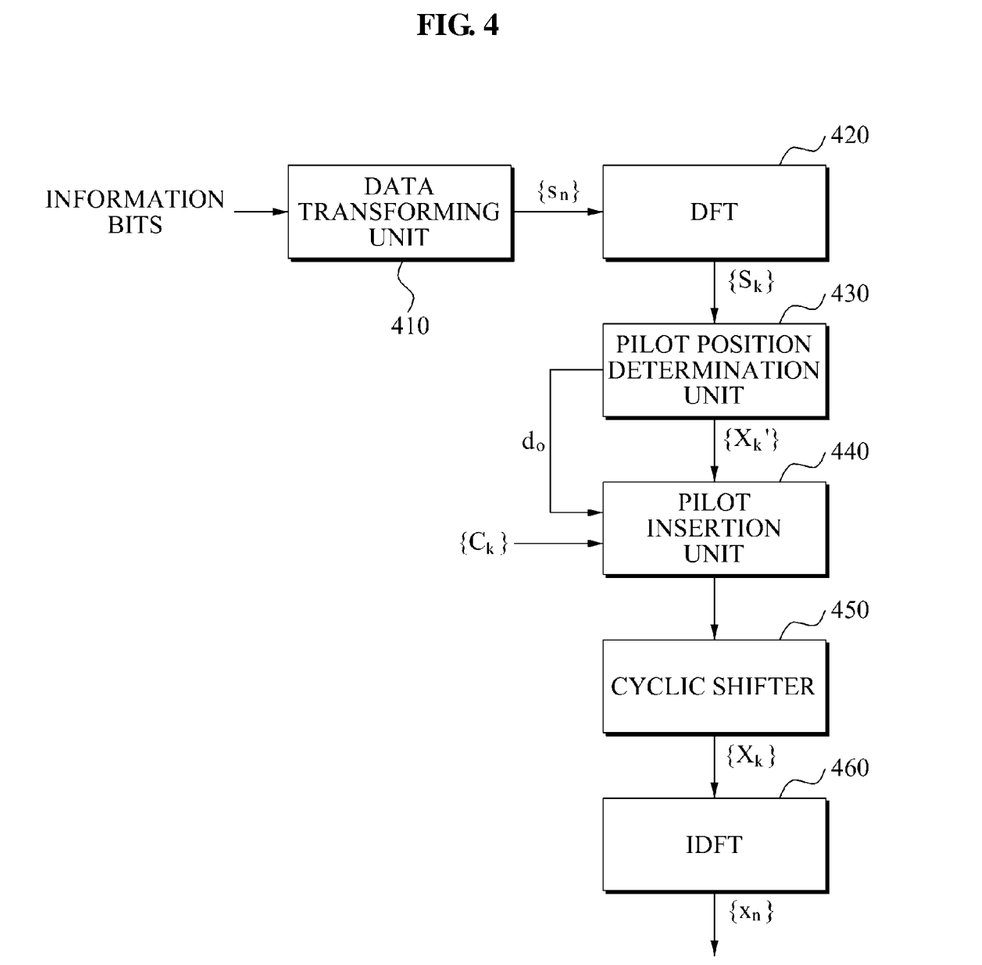
FIG. 4 is a diagram illustrating a transmitter for performing frequency domain equalization according to another exemplary embodiment.

FIG. 4 illustrates a transmitter for performing frequency domain equalization according to another exemplary embodiment.

As illustrated in FIG. 4, the transmitter for performing frequency domain equalization comprises a data transformation unit 410, a DFT 420, a pilot position determination unit 430, a pilot insertion unit 440, a cyclic-shifter 450, and an IDFT 460.

Operations of the data transformation unit 410, the DFT 420, the pilot position determination unit 430, a pilot insertion unit 440, and the IDFT 460 may be identical to that described above regarding the operations in FIG. 2.

The cyclic shifter 450 left cyclic-shits an output of the pilot insertion unit 440 up to $d_o$ number of times in a frequency domain. Consequently, a first element of an output $\{X_k\}$ of the cyclic-shifter 450 becomes a first pilot.

In this case, a receiver may not be required to additionally perform an operation for ascertaining the positions of the pilots since the receiver may know that the first element of the output $\{X_k\}$ is the first pilot. The receiver may ascertain the number of times frequency spectrums of data are cyclic-shifted by ascertaining $d_o$.

Figure 5:
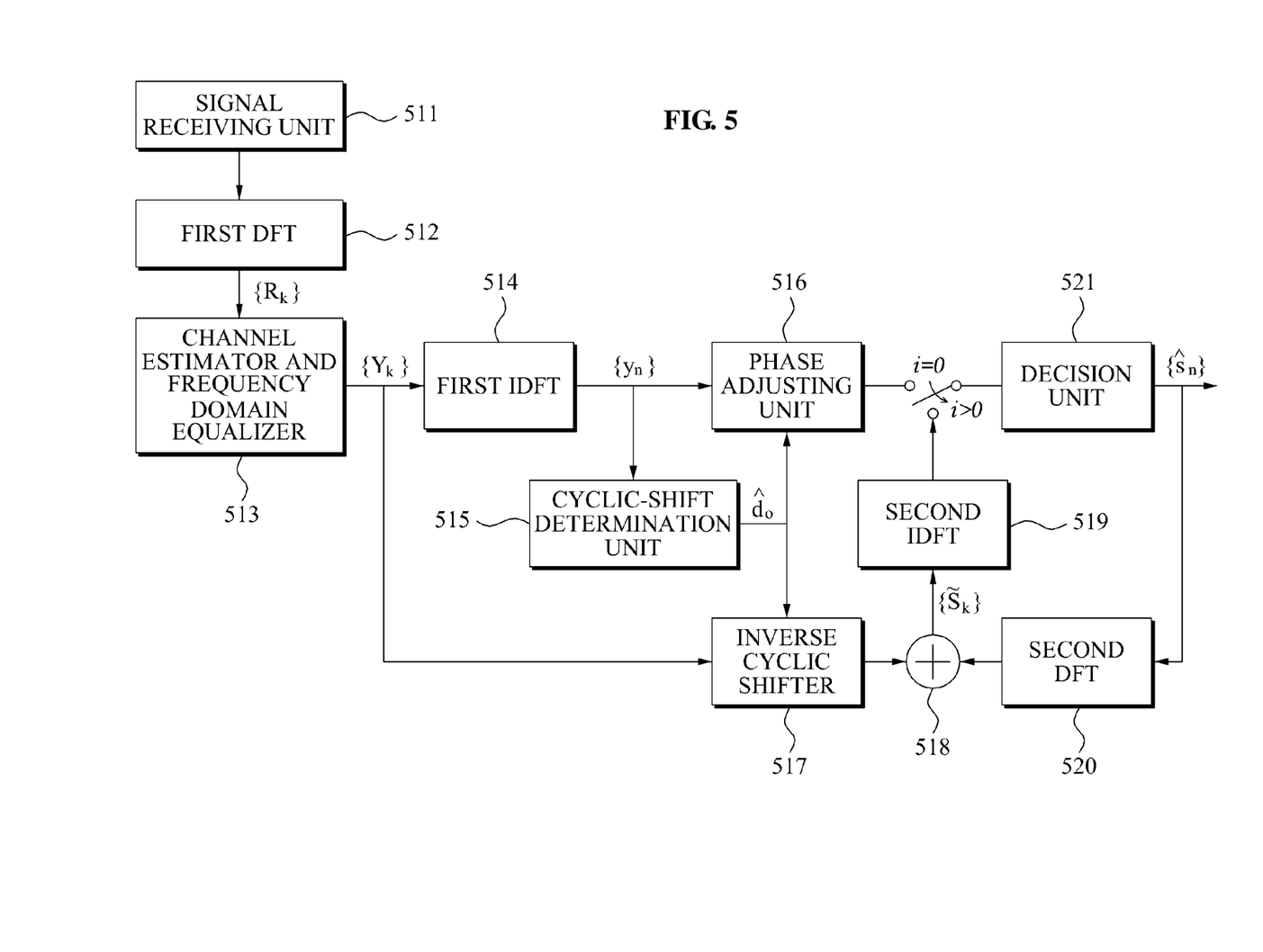
FIG. 5 is diagram illustrating a receiver for performing frequency domain equalization according to another exemplary embodiment.

FIG. 5 illustrates a receiver for performing frequency domain equalization according to another exemplary embodiment.

As illustrated in FIG. 5, the receiver for performing frequency domain equalization comprises a signal receiving unit 511, a first DFT 512, a channel estimator/frequency domain equalizer 513, a first IDFT 514, a cyclic shift determination unit 515, a phase adjusting unit 516, an inverse cyclic shifter 517, an adder 518, a second IDFT 519, a second DFT 520, and a decision unit 521.

The signal receiving unit 511 receives a signal transmitted from a transmitter via a channel.

The first DFT 512 transforms the received signal into a first signal $\{R_K\}$ in a frequency domain. In this case, the first signal includes frequency spectrums and pilots, and the frequency spectrums and the pilots are cyclic-shifted so that at least one target pilot of the pilots exists in a predetermined position. Here, for convenience of explanation, it is assumed that a target pilot is a first pilot of the pilots, and the predetermined position is a position of a first frequency element of the first signal $\{R_K\}$.

The frequency domain equalizer 513 estimates a channel state based on the pilots, and performs equalization with respect to the first signal $\{R_K\}$ in a frequency domain using the estimated channel. In this case, an output of the frequency domain equalizer 513 is $\{Y_K\}$.

The first IDFT 514 transforms the output $\{Y_K\}$ of the frequency domain equalizer 513 into a time domain signal $\{y_n\}$.

The cyclic-shift determination unit 515 determines the number of times the frequency spectrums of data and pilots are cyclic-shifted based on an output of the first IDFT 514. Here, since it is assumed that the predetermined position is the position of the first frequency element of the first signal, it may be ascertained that the frequency spectrums of data and the pilots are left cyclic-shifted up to $d_o$ number of times.

The phase adjusting unit 516 adjusts a phase of an output of the first IDFT 514 based on the ascertaining result in the cyclic shift determination unit 515. This is because a 'cyclic shift' in a frequency domain may correspond to a 'phase shift' in a time domain.

Where an i number of iterations is 0, the decision unit 521 makes a decision on the data using an output of the phase adjusting unit 516. In this case, since a portion of frequency spectrums of original data is eliminated, there may be a corruption in data where a decision is made. Such corrupted data may be recovered as the i number of iteration increases.

That is, the inverse cyclic shifter 517 cyclic shifts $\{Y_K\}$ up to $d_o$ number of times in an inverse direction of the frequency spectrums of data and the pilots are cyclic-shifted. As an example, where frequency spectrums and pilots are left cyclic-shifted, the inverse cyclic shifter 517 right cyclic-shifts $\{Y_K\}$ up to $d_o$ number of times.

The second DFT 520 re-transforms an output $\{\tilde{s}_n\}$ of the decision unit 521 into a frequency domain signal.

The adder 518 provides the second DFT 519 with a signal $\{\tilde{S}_k\}$ which is generated by adding an output of the inverse cyclic shifter 517 to an output of the second DFT 519.

The second DFT 519 re-provides the decision unit 521 with an output of the second DFT 519, and the decision unit 521 restores a corrupted portion of the data.

Figure 6:
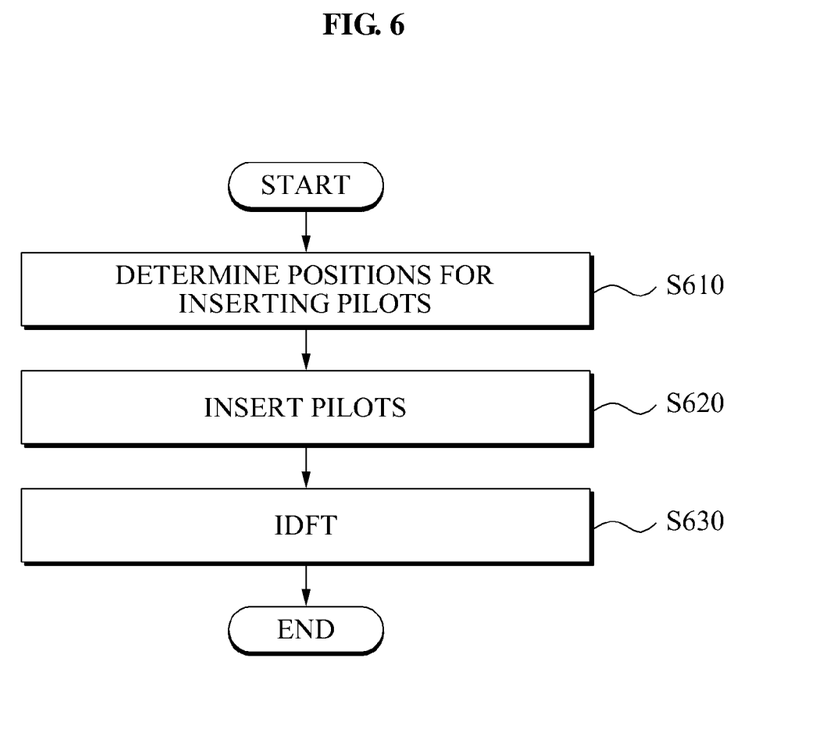
FIG. 6 is flowchart illustrating a method for transmitting a signal for performing frequency domain equalization according to an exemplary embodiment.

FIG. 6 illustrates a method for transmitting a signal for performing frequency domain equalization according to an exemplary embodiment.

In operation S610, positions for inserting pilots in a frequency domain are determined based on frequency spectrums of data.

In operation S620, the pilots are inserted between the frequency spectrums of the data according to the determined positions for inserting pilots.

In operation S630, the frequency spectrums of the data and the inserted pilots are transformed to a time domain signal.

Although not illustrated in FIG. 6, the method may further comprise an operation of cyclic-shifting the frequency spectrums of the data and the inserted pilots so that at least one target pilot of the pilots exists in a predetermined position.

According to certain embodiments described above, a transmitter may transmit pilots to a receiver without deteriorating efficiency of a frequency.

According to certain embodiments described above, a receiver may effectively locate positions of pilots without additionally receiving information regarding the positions of the pilots.

According to certain embodiments described above, distortion of data/signal may be minimized.

The above-described methods including an exemplary signal transmission method for performing frequency domain equalization may be recorded, or fixed in one or more computer-readable media that includes program instructions to be implemented by a computer to cause a processor to execute or perform the program instructions. The media may also include, independent or in combination with the program instructions, data files, data structures, and the like. Examples of computer-readable media may include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like Examples of program instructions include both machine code, such as produced by a compiler, and files containing higher level code that may be executed by the computer using an interpreter. The described hardware devices may be configured to act as one or more software modules in order to perform the methods and/or operations described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A transmitter configured to perform frequency domain equalization, the transmitter comprising:
   a pilot position determination unit configured to determine positions for inserting pilots in a frequency domain based on frequency spectrums of data; and
   a pilot insertion unit configured to insert the pilots between the frequency spectrums of the data according to the determined positions for inserting the pilots,
   wherein the pilot position determination unit is further configured to determine the positions so as to minimize a distortion between a signal in a time domain corresponding to the frequency spectrums of the data and a signal in a time domain corresponding to frequency spectrums of the inserted pilots.

2. The transmitter of claim 1, wherein the pilot position determination unit determines the positions for inserting the pilots based on distortion strength of the data.

3. The transmitter of claim 1, wherein the pilot position determination unit determines the positions for inserting the pilots based on the frequency spectrums of the data so as to minimize distortion strength of the data.

4. The transmitter of claim 1, wherein the pilot position determination unit extracts the frequency spectrums of the data according to a predetermined frequency interval, and determines the positions for inserting the pilots based on the extracted frequency spectrums of the data so that the distortion strength of the data is a minimum.

5. The transmitter of claim 1, wherein the pilot insertion unit eliminates target elimination spectrums corresponding to the determined positions for inserting the pilots from among the frequency spectrums of the data, and inserts the pilots according to the determined positions for inserting the pilots.

6. The transmitter of claim 1, wherein the pilot insertion unit inserts the pilots between the frequency spectrums of the data according to the determined positions for inserting the pilots with a predetermined frequency interval.

7. The transmitter of claim 1, further comprising:
   an inverse discrete Fourier transformer (IDFT) which transforms the frequency spectrums of the data and the inserted pilots into a time domain signal.

8. The transmitter of claim 1, further comprising:
   a cyclic shifter which cyclic-shifts the frequency spectrums of the data and the inserted pilots so that at least one target pilot of the pilots exists in a predetermined position.

9. The transmitter of claim 1, wherein the transmitter transmits to a receiver and the receiver detects data by cyclic-shifting a received signal up to $d_o$ number of times in an inverse direction of the frequency spectrums of data included in a transmission signal where $d_o$ is >0.

10. The transmitter of claim 1, wherein the pilot position determination unit determines the positions using a difference between the signal corresponding to the frequency spectrums of the data and time domain signal corresponding to a signal whose at least one frequency spectrum from among the frequency spectrums is eliminated.

11. A signal transmission method for performing frequency domain equalization, the method comprising:
    determining positions for inserting pilots in a frequency domain based on frequency spectrums of data;
    inserting the pilots between the frequency spectrums of the data according to the determined positions for inserting the pilots; and
    transforming the frequency spectrums of data and the inserted pilots to a time domain signal,
    wherein the determining determines the positions so as to minimize a distortion between a signal in a time domain corresponding to the frequency spectrums of the data and a signal in a time domain corresponding to frequency spectrums of the inserted pilots.

12. The method of claim 11, wherein the determining of the positions for inserting the pilots comprises:
    calculating distortion strength of the data based on the frequency spectrums of the data where the pilots are inserted; and
    determining the positions for inserting the pilots so that the calculated distortion strength is a minimum.

13. The method of claim 11, further comprising:
    cyclic-shifting the frequency spectrums of the data and the inserted pilots so that at least one target pilot of the pilots exists in a predetermined position.

14. The method of claim 11, wherein when a position of a first pilot is determined, all positions of Np number of pilots are determined since a frequency interval of neighboring pilots is an integer where Np is >0.

15. A non-transitory computer-readable storage medium storing a program for implementing a signal transmission method for performing frequency domain equalization, the program comprising instructions to cause a computer to:
    determine positions for inserting pilots in a frequency domain based on frequency spectrums of data; and
    insert the pilots between the frequency spectrums of the data according to the determined positions for inserting the pilots,
    wherein the positions are determined so as to minimize a distortion between a signal in a time domain corresponding to the frequency spectrums of the data and a signal in a time domain corresponding to frequency spectrums of the inserted pilots.

* * * * *